US012609232B2

(12) United States Patent
Saito et al.

(10) Patent No.: US 12,609,232 B2
(45) Date of Patent: Apr. 21, 2026

(54) MAGNETIC CORE HOUSING AND NOISE REDUCTION DEVICE

(71) Applicant: TOKIN Corporation, Shiroishi (JP)

(72) Inventors: Naoko Saito, Sendai (JP); Yuji Nitobe, Sendai (JP); Yoshihiro Saito, Sendai (JP); Shuichi Hayasaka, Sendai (JP)

(73) Assignee: TOKIN CORPORATION, Shiroishi (JP)

( * ) Notice: Subject to any disclaimer, the term of this patent is extended or adjusted under 35 U.S.C. 154(b) by 906 days.

(21) Appl. No.: 17/813,527

(22) Filed: Jul. 19, 2022

(65) Prior Publication Data

US 2023/0027914 A1 Jan. 26, 2023

(30) Foreign Application Priority Data

Jul. 20, 2021 (JP) ................................ 2021-119583

(51) Int. Cl.
*H01F 27/24* (2006.01)
*G10K 11/16* (2006.01)

(52) U.S. Cl.
CPC ............. *H01F 27/24* (2013.01); *G10K 11/16* (2013.01)

(58) Field of Classification Search
CPC ........ H01F 27/24; H01F 27/02; H01F 27/266; H01F 2017/065; H01F 17/06; H05K 9/0098
See application file for complete search history.

(56) References Cited

U.S. PATENT DOCUMENTS 4,408,175 A * 10/1983 Nelson .................. G01R 15/18 174/92
4,972,167 A * 11/1990 Fujioka .................. H01F 27/33 336/212
5,355,109 A * 10/1994 Yamazaki ............ H01F 27/027 174/664
5,486,803 A * 1/1996 Igarashi ................. H01F 27/33 336/212
(Continued)

FOREIGN PATENT DOCUMENTS

EP 3018666 A2 5/2016
EP 3540748 A1 9/2019
(Continued)

OTHER PUBLICATIONS

European Patent Office, Extended European Search Report Issued in Application No. 22185171.0, Dec. 20, 2022, Germany, 11 pages.
(Continued)

*Primary Examiner* — Mang Tin Bik Lian
(74) *Attorney, Agent, or Firm* — McCoy Russell LLP

(57) ABSTRACT

A magnetic core housing capable of applying a sufficient force to a magnetic core is provided. A magnetic core housing according to an aspect of the disclosure includes first and second housings each capable of housing a core, a hinge configured to connect the first and second housings with each other so that they can be opened and closed with respect to each other, and a metal spring disposed in the first housing. The metal spring includes a planar part and a pair of spring parts, and also includes reinforcing means for preventing the planar part from being bent due to a force transmitted from the pair of spring parts when the core is housed in the first housing.

3 Claims, 11 Drawing Sheets

(56) References Cited

U.S. PATENT DOCUMENTS

| | | | | |
|---|---|---|---|---|
| 5,535,075 | A | 7/1996 | Takahashi et al. | |
| 5,682,280 | A | 10/1997 | Takahashi et al. | |
| 5,942,964 | A * | 8/1999 | Takeuchi | H05K 9/0066 174/92 |
| 5,943,312 | A | 8/1999 | Takahashi et al. | |
| 6,023,023 | A * | 2/2000 | Takeuchi | H03H 1/0007 174/92 |
| 6,031,693 | A | 2/2000 | Takahashi et al. | |
| 2007/0120635 | A1 * | 5/2007 | Kobayashi | H01F 17/06 336/174 |
| 2016/0135310 | A1 * | 5/2016 | Kawai | H01F 17/06 336/92 |
| 2017/0040096 | A1 * | 2/2017 | Hayase | H01F 27/266 |
| 2020/0014356 | A1 * | 1/2020 | Tsukamoto | H03H 1/0007 |

FOREIGN PATENT DOCUMENTS

| | | | |
|---|---|---|---|
| JP | H07210915 | A | 8/1995 |
| JP | H1032395 | A | 2/1998 |
| JP | 2001326123 | A | 11/2001 |
| JP | 2016092274 | A | 5/2016 |
| WO | 2019107272 | A1 | 6/2019 |

OTHER PUBLICATIONS

Japan Patent Office, Office Action Issued in Application No. 2021-119583, Oct. 22, 2024, 6 pages.

* cited by examiner

MAGNETIC CORE HOUSING AND NOISE REDUCTION DEVICE

CROSS-REFERENCE TO RELATED APPLICATION

The present application claims priority to Japanese Patent Application No. 2021-119583, entitled “Magnetic Core Housing and Noise Reduction Device”, and filed on Jul. 20, 2021. The entire contents of the above-listed application is hereby incorporated by reference for all purposes.

TECHNICAL FIELD

The present disclosure relates to a magnetic core housing and a noise reduction device.

BACKGROUND

In recent years, a noise reduction device which houses a magnetic material such as ferrite therein and is attached around a signal cable so that noises superimposed on signals propagating through the signal cable are removed has been widely used. Japanese Unexamined Patent Application Publication No. H10-32395 discloses a technology relating to such a noise reduction device.

SUMMARY

The noise reduction device disclosed in Japanese Unexamined Patent Application Publication No. H10-32395 is manufactured by dividing a cylindrical magnetic core into two pieces on a plane along a central axis thereof, and housing each of these two divided magnetic cores in a respective one of two divided sections of a housing made of a resin material. The inner surface of each of the divided housings is provided with an elastic claw that applies, when the corresponding divided magnetic core is housed therein, a force toward the central axis to the magnetic core. By the above-described configuration, it is possible, when the noise reduction device is attached around a signal cable, to bring the two divided magnetic cores into close contact with each other on their division surfaces (i.e., the surfaces which were formed when one magnetic core was divided into the two pieces).

In the technology disclosed in Japanese Unexamined Patent Application Publication No. H10-32395, the elastic claw is formed of a resin. However, resins have creep characteristics, so when the elastic claw (e.g., a spring) is formed of a resin, the spring deteriorates with time. When the spring deteriorates with time as described above, it cannot apply a sufficient force to the magnetic core. Therefore, it is difficult, when the noise reduction device is attached around the signal cable, to bring the two divided magnetic cores into close contact with each other on their division surfaces.

In view of the above-described problem, an object of the present disclosure is to provide a magnetic core housing capable of applying a sufficient force to a magnetic core, and a noise reduction device using such a magnetic core housing.

A first exemplary aspect is a magnetic core housing made of a resin material, capable of housing a cylindrical magnetic core having a cavity extending in a direction of a central axis of the magnetic core, the magnetic core housing including: a first housing capable of housing a first core, the first core being one of two pieces of the magnetic core divided from each other on a plane along the central axis; a second housing capable of housing a second core, the second core being the other of the two pieces of the magnetic core divided from each other on the plane along the central axis; a hinge configured to connect the first and second housings with each other so that the first and second housings can be opened and closed with respect to each other; and a first metal spring disposed in the first housing and configured to apply a force toward the center axis to the first core when the first core is housed in the first housing, in which the first metal spring includes a planar part and a pair of spring parts inclined from both ends of the planar part toward the central axis, the both ends of the planar part being both ends in a direction in which the central axis extends, and the magnetic core housing further includes reinforcing means for preventing the planar part from being bent due to a force transmitted from the pair of spring parts when the first core is housed in the first housing.

Another exemplary aspect is a noise reduction device including: the above-described magnetic core housing; a first core housed in the first housing; and a second core housed in the second housing.

According to the present disclosure, it is possible to provide a magnetic core housing capable of applying a sufficient force to a magnetic core, and a noise reduction device using such a magnetic core housing.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

First Embodiment

An embodiment according to the present disclosure will be described hereinafter with reference to the drawings.

Figure 1:
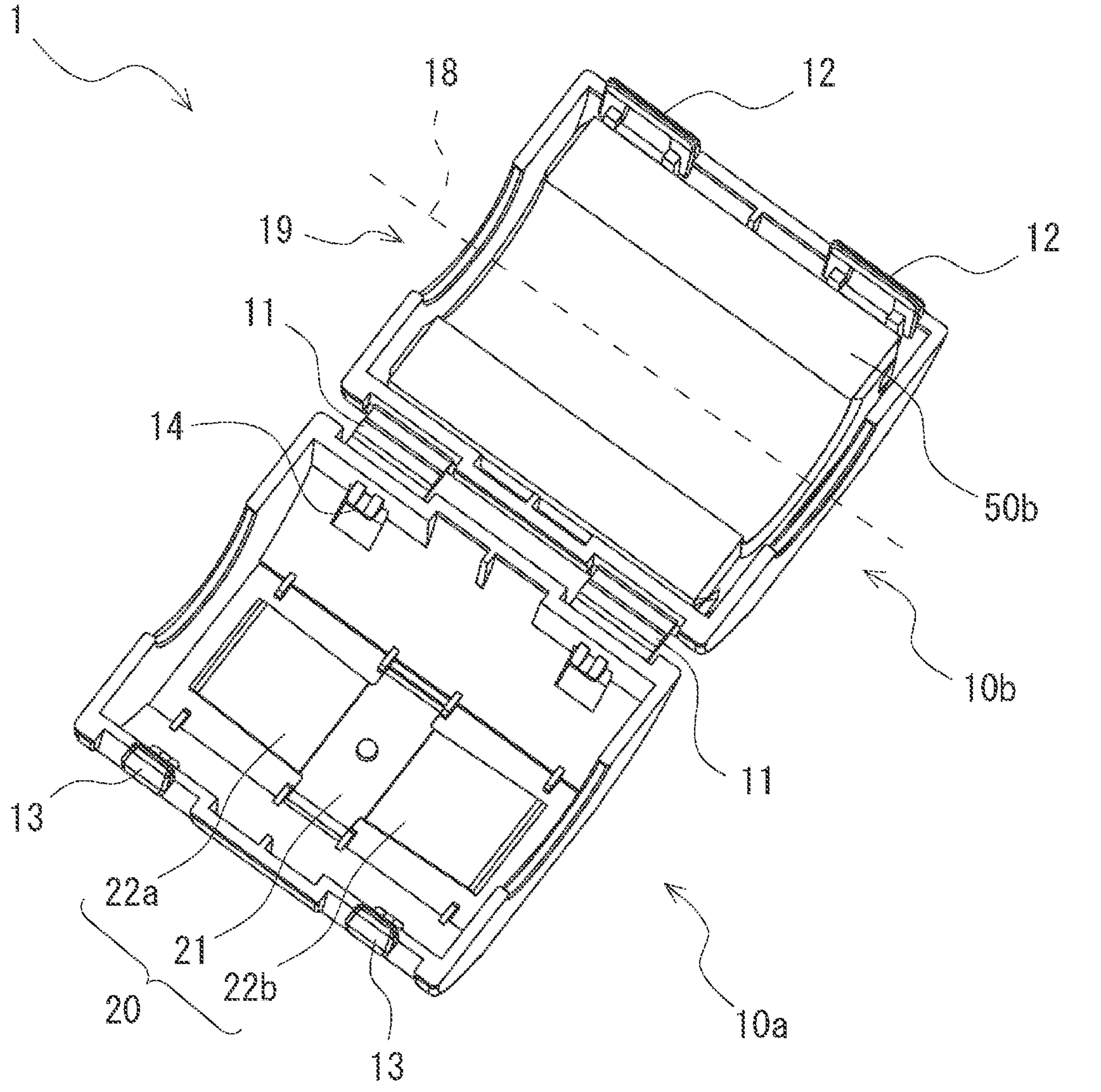
FIG. 1 is a perspective view showing a magnetic core housing according to a first embodiment.
Figure 2:
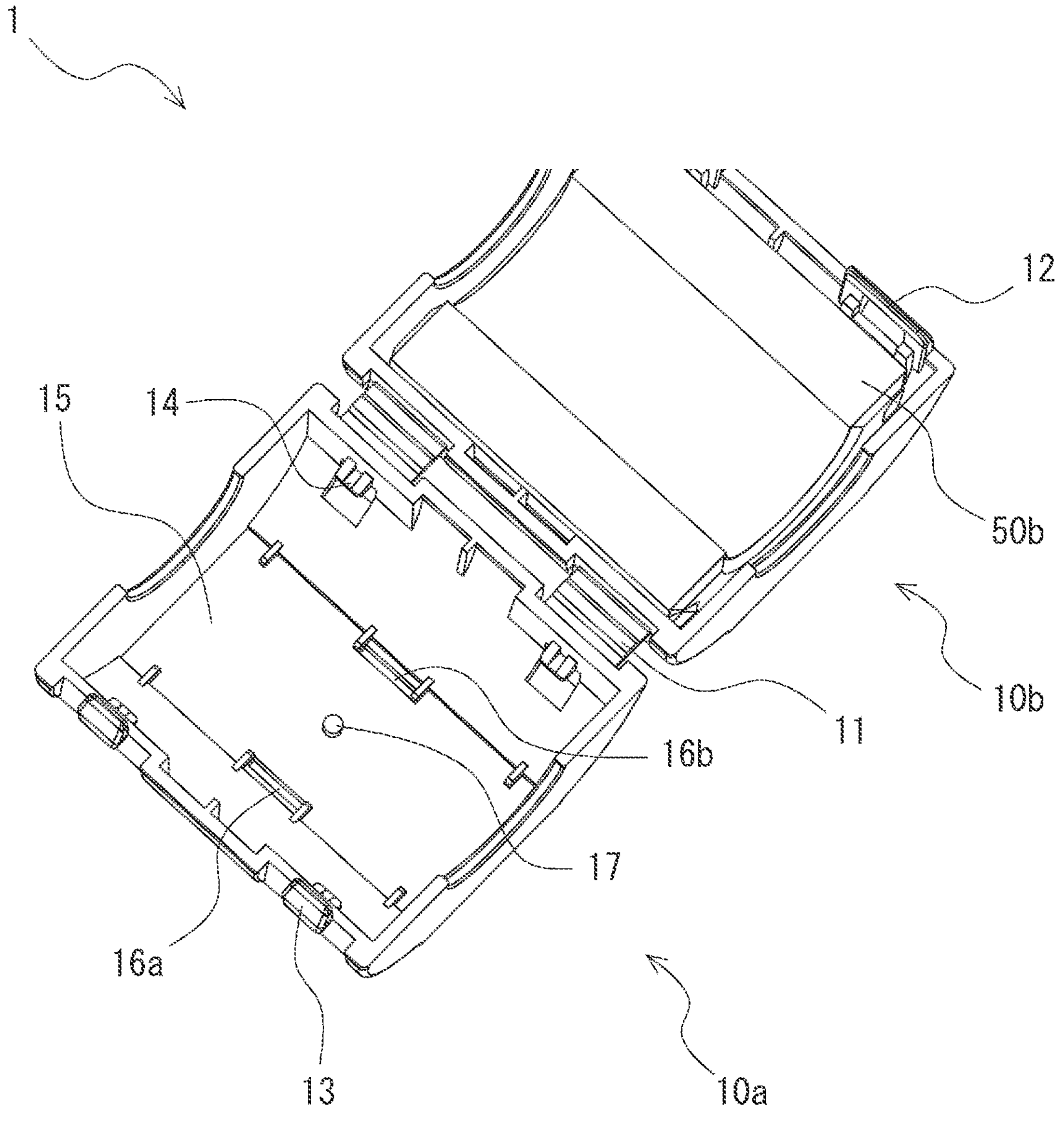
FIG. 2 is a perspective view showing the magnetic core housing according to the first embodiment.
Figure 3:
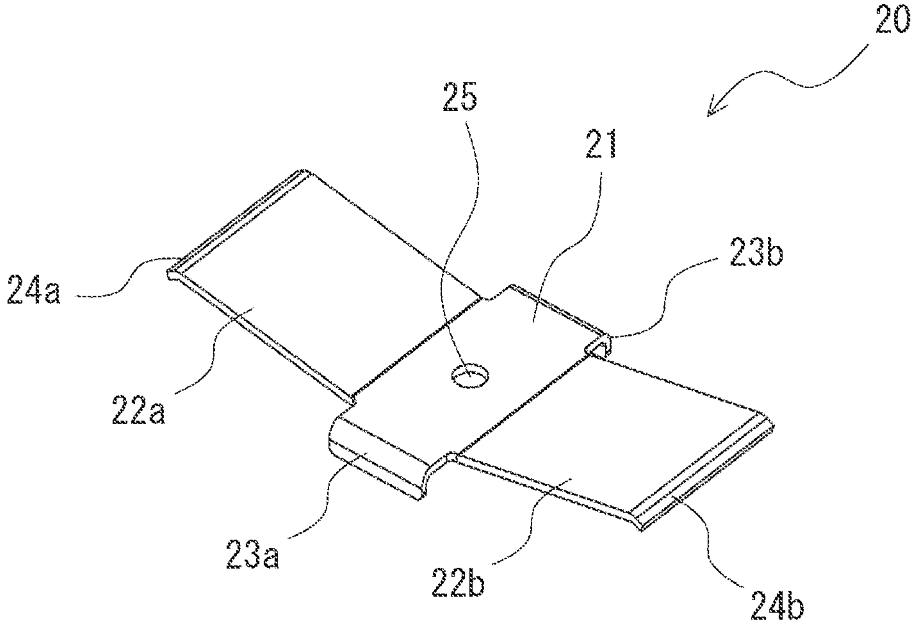
FIG. 3 is a perspective view showing an example of a metal spring provided in the magnetic core housing according to the first embodiment.
Figure 4:
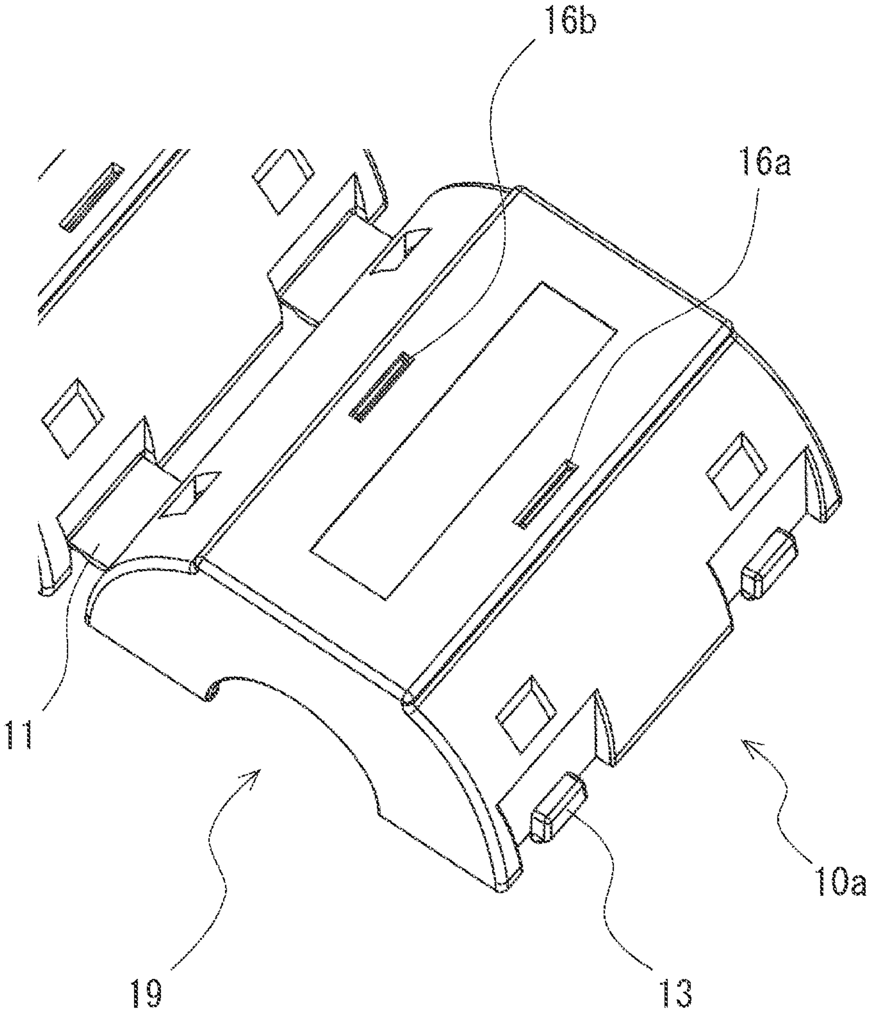
FIG. 4 is a perspective view of the magnetic core housing according to the first embodiment as viewed from the outside thereof.
Figure 5:
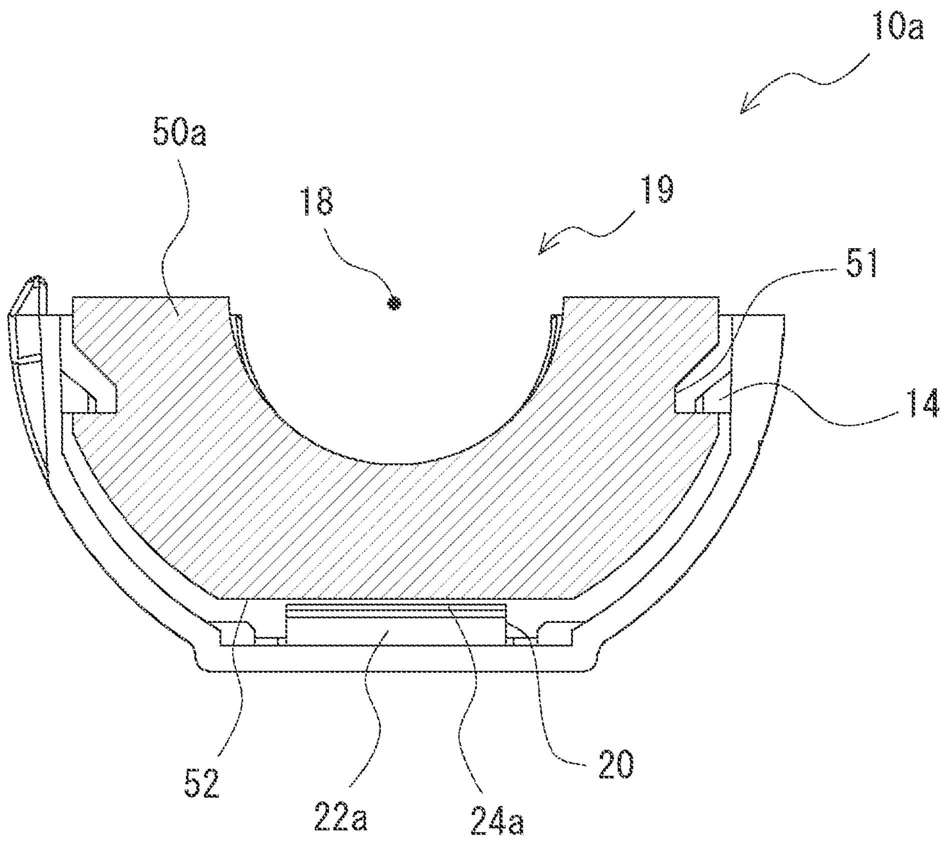
FIG. 5 is a cross-sectional view showing a state in which a magnetic core is attached to the magnetic core housing according to the first embodiment.

Each of FIGS. 1 and 2 is a perspective view showing a magnetic core housing according to a first embodiment. FIG. 3 is a perspective view showing an example of a metal spring provided in the magnetic core housing according to the first embodiment. FIG. 4 is a perspective view of the magnetic core housing according to the first embodiment as viewed from the outside thereof. FIG. 5 is a cross-sectional view showing a state in which a magnetic core is attached to the magnetic core housing according to the first embodiment.

As shown in FIG. 1, a magnetic core housing 1 according to this embodiment is a housing capable of housing magnetic cores 50*a* and 50*b* and includes a housing 10*a* (a first housing) and a housing 10*b* (a second housing) which are two pieces divided from each other on a plane along a central axis 18. The magnetic core housing 1 according to this embodiment is formed of a resin material. Note that, in this specification, the housings 10*a* and 10*b* are also referred to collectively as a housing 10.

The magnetic cores 50*a* and 50*b* housed in the magnetic core housing 1 form a cylindrical magnetic core including a cavity 19 extending in the direction of the central axis 18 (the longitudinal direction of the magnetic core housing 1) when the magnetic core housing 1 is brought into a closed state. The magnetic cores 50*a* and 50*b* are formed of a magnetic material such as ferrite. The magnetic cores 50*a* and 50*b* are two pieces divided from each other on a plane along the central axis 18, and one of the divided magnetic cores, i.e., the magnetic core 50*a* (the first core) is housed in the housing 10*a*, and the other divided magnetic core, i.e., the magnetic core 50*b* (the second core) is housed in the housing 10*b*. Note that each of FIGS. 1 and 2 shows a state in which only the magnetic core 50*b* is housed in the corresponding housing 10*b*. Further, in this specification, the magnetic cores 50*a* and 50*b* are also referred to collectively as a magnetic core 50.

The housings 10*a* and 10*b* are connected to each other by using a hinge 11 so that they can be opened and closed with respect to each other. Each of FIGS. 1 and 2 shows a state in which the housings 10*a* and 10*b* are opened. Further, the housings 10*a* and 10*b* are brought into a closed state by rotating the housings 10*a* and 10*b* around the hinge 11 so as to be closed, and mating (i.e., inserting) a claw 13 provided in the housing 10*a* with (i.e., into) an opening 12 formed in the housing 10*b*.

A noise reduction device according to this embodiment is used in a state in which the magnetic cores 50*a* and 50*b* are housed in the magnetic core housing 1. That is, the noise reduction device according to this embodiment is used in a state in which the magnetic core housing 1 in which the magnetic cores 50*a* and 50*b* are housed is attached around a signal cable. When the housings 10*a* and 10*b* are in a closed state, the magnetic cores 50*a* and 50*b* have a cylindrical shape including a cavity 19 extending in the direction of the central axis 18, and the signal cable is disposed in the cavity 19 of the magnetic cores 50*a* and 50*b*.

Further, the magnetic core housing 1 according to this embodiment includes metal springs 20. The metal springs 20 are disposed on the inner peripheral surfaces 15 (see FIG. 2) of the housings 10*a* and 10*b*. When the two divided magnetic cores 50*a* and 50*b* are housed in the housings 10*a* and 10*b*, respectively, each of the metal springs 20 applies a force toward the central axis 18 to a respective one of the magnetic cores 50. As a result, it is possible, when the noise reduction device is attached around the signal cable, to bring the two divided magnetic cores 50*a* and 50*b* into close contact with each other on their division surfaces (i.e., the surfaces which were formed when one magnetic core was divided into the two pieces). Note that it is preferred that a metal spring 20 be provided in each of the housings 10*a* and 10*b*. However, in this embodiment, the metal spring 20 may be provided in only one of the housings 10*a* and 10*b*.

As shown in FIGS. 1 and 3, the metal spring 20 includes a planar part 21, and a pair of spring parts 22*a* and 22*b*. The pair of spring parts 22*a* and 22*b* are configured so as to be inclined from both ends of the planar part 21, which are ends in the direction in which the central axis 18 extends (i.e., both ends of the planar part 21 in the longitudinal direction of the magnetic core housing 1), toward the central axis 18 (toward the cavity 19). Further, in this embodiment, the metal spring 20 includes reinforcing means. The reinforcing means is means for preventing the planar part 21 from being bent due to a force transmitted from the pair of spring parts 22*a* and 22*b* to the planar part 21 when the magnetic cores 50*a* and 50*b* are housed in the housings 10*a* and 10*b*.

As shown in FIG. 3, the planar part 21 of the metal spring 20 has a rectangular shape and reinforcing means 23*a* and 23*b* can be formed by folding each of two sides of the rectangular planar part 21 located between the two sides thereof on which the pair of spring parts 22*a* and 22*b* are formed into an L-shape in cross section. In the example of the configuration shown in FIG. 3, the reinforcing means 23*a* and 23*b* are formed by folding the two sides of the planar part 21 opposed to each other in a direction receding from the central axis 18 (i.e., toward the outer side of the housings 10*a* and 10*b*), and thereby folding each of them into an L-shape in cross section.

As shown in FIGS. 2 and 4, openings 16*a* and 16*b* are formed at positions corresponding to the reinforcing means 23*a* and 23*b*, respectively, of the housings 10*a* and 10*b*. The reinforcing means 23*a* and 23*b* are inserted into the openings 16*a* and 16*b* of the housings 10*a* and 10*b*, respectively, so that they are positioned. In particular, in this embodiment, since the reinforcing means 23*a* and 23*b* are inserted into the line-shaped openings 16*a* and 16*b*, respectively, it is possible to prevent the metal spring 20 from moving in the direction in which the central axis 18 extends or in the direction perpendicular to the central axis 18. Further, when the magnetic core housing 1 is formed as described above, it is possible, as shown in FIG. 4, to visually check whether or not the reinforcing means 23*a* and 23*b* are correctly inserted into the openings 16*a* and 16*b*, respectively, from the outside of the housings 10*a* and 10*b*.

In this embodiment, as shown in FIG. 3, a hole 25 is formed at the center of the planar part 21 of the metal spring 20. Further, as shown in FIG. 2, a projection 17 is provided on the inner peripheral surface 15 of each of (or one of) the housings 10*a* and 10*b*. In this embodiment, the projection 17 provided in each of (or one of) the housings 10*a* and 10*b* is mated with (i.e., inserted into) the hole 25 of the metal spring 20, so that the metal spring 20 is properly positioned. Further, the projection 17 also functions as a stopper for limiting the amount (i.e., the length) of the pushing of the metal spring 20. Specifically, the height of the projection 17 is adjusted so that when the spring part 22 is pushed by the magnetic core 50, the spring part 22 is not pushed beyond the elastic limit thereof.

The metal spring 20 abuts against (i.e., comes into contact with) a surface 52 (see FIG. 5) of the magnetic core 50*a* at abutting parts 24*a* and 24*b*. Further, when the magnetic core 50 is housed in the housings 10*a* and 10*b*, the abutting parts 24*a* and 24*b* of the metal spring 20 slide on the surface 52 (see FIG. 5) of the magnetic core 50*a*. The outer peripheral part of the magnetic core 50, which is opposed to (i.e., abuts against) the metal spring 20, is preferably planar. That is, if the magnetic core has such a shape that the surface thereof against which the abutting part 24 abuts is a curved surface and hence the magnetic core abuts against the abutting part 24 of the metal spring 20 at a point, the magnetic core cannot receive a sufficient reaction force, so that the effect of the metal spring 20 is reduced. Therefore, the surface 52 against which the abutting part 24 of the metal spring 20 abuts is preferably planar and parallel to the abutting part 24.

Further, the metal spring 20 may have such a structure that the ends of the pair of spring parts 22*a* and 22*b* on the side opposite to the side on which the planar part 21 is located may be folded in a direction receding from the central axis 18. That is, the end of each of the spring parts 22*a* and 22*b* in the longitudinal direction may be folded toward the outer side of the corresponding one of the housings 10*a* and 10*b*. In this way, it is possible to make the shape of the contact surface between each of the abutting parts 24*a* and 24*b* and the surface 52 of the magnetic core 50 roughly a line-like shape. Therefore, when the magnetic core 50 is housed in the housings 10*a* and 10*b*, the abutting parts 24*a* and 24*b* can easily slide on the surface 52 (see FIG. 5) of the magnetic core 50.

As shown in FIG. 5, when the magnetic core 50*a* is housed in the housing 10*a*, the magnetic core 50*a* abuts against the metal spring 20. In this way, a force toward the central axis 18 is applied to the magnetic core 50*a*. Further, cutout parts 51 are formed on the side surfaces of the magnetic core 50*a*, and projections 14 formed in the housing 10*a* abut against (i.e., mate with) the cutout parts 51, thus making it possible to prevent the magnetic core 50*a* from being dislodged from the housing 10*a*.

Further, when the noise reduction device (the magnetic core housing 1 in which the magnetic core 50 housed) is attached around a signal cable, the signal cable is disposed in the cavity 19 of the magnetic core 50. Since a force from the metal spring 20 toward the central axis 18 is applied to the magnetic core 50, it is possible to bring the two divided magnetic cores 50*a* and 50*b* into close contact with each other on their division surfaces.

As described above, in this embodiment, since metal is used as the material of the spring (the metal spring 20), it is possible to prevent the spring from deteriorating with time. Further, in this embodiment, the magnetic core housing 1 is provided with the reinforcing means 23*a* and 23*b* that prevent, when the magnetic core 50 is housed in the housing 10, the planar part 21 from being bent due to a force transmitted from the pair of spring parts 22*a* and 22*b* of the metal spring 20. That is, by providing (i.e., forming) the reinforcing means 23*a* and 23*b* by folding each of the two sides of the planar part 21 opposed to each other into an L-shape in cross section, it is possible, when the pair of spring parts 22*a* and 22*b* are displaced (e.g., compressed or expanded), to prevent the planar part 21 from being curved at the center thereof. In this way, it is possible to prevent the reaction force of the metal spring 20 from being dispersed, and thereby to concentrate the elastic force of the metal spring 20 into a force toward the central axis 18.

Therefore, it is possible, when the magnetic core 50 is housed in the housing 10, to apply a sufficient force to the magnetic core 50 by using the metal spring 20. Accordingly, it is possible, when the noise reduction device is attached around a signal cable, to bring the two divided magnetic cores 50*a* and 50*b* into close contact with each other on their division surfaces.

Second Embodiment

Figure 6:
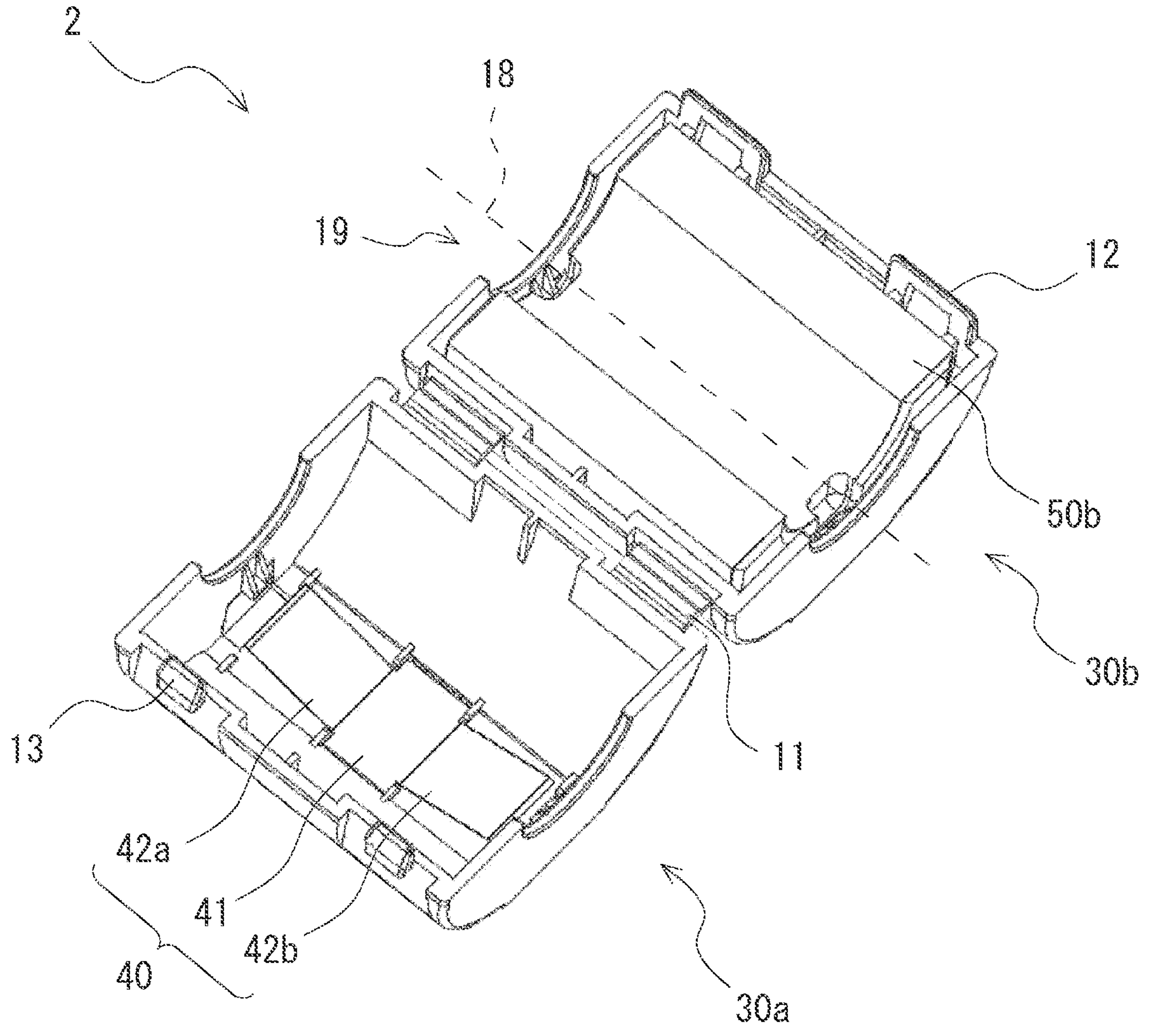
FIG. 6 is a perspective view showing a magnetic core housing according to a second embodiment.
Figure 7:
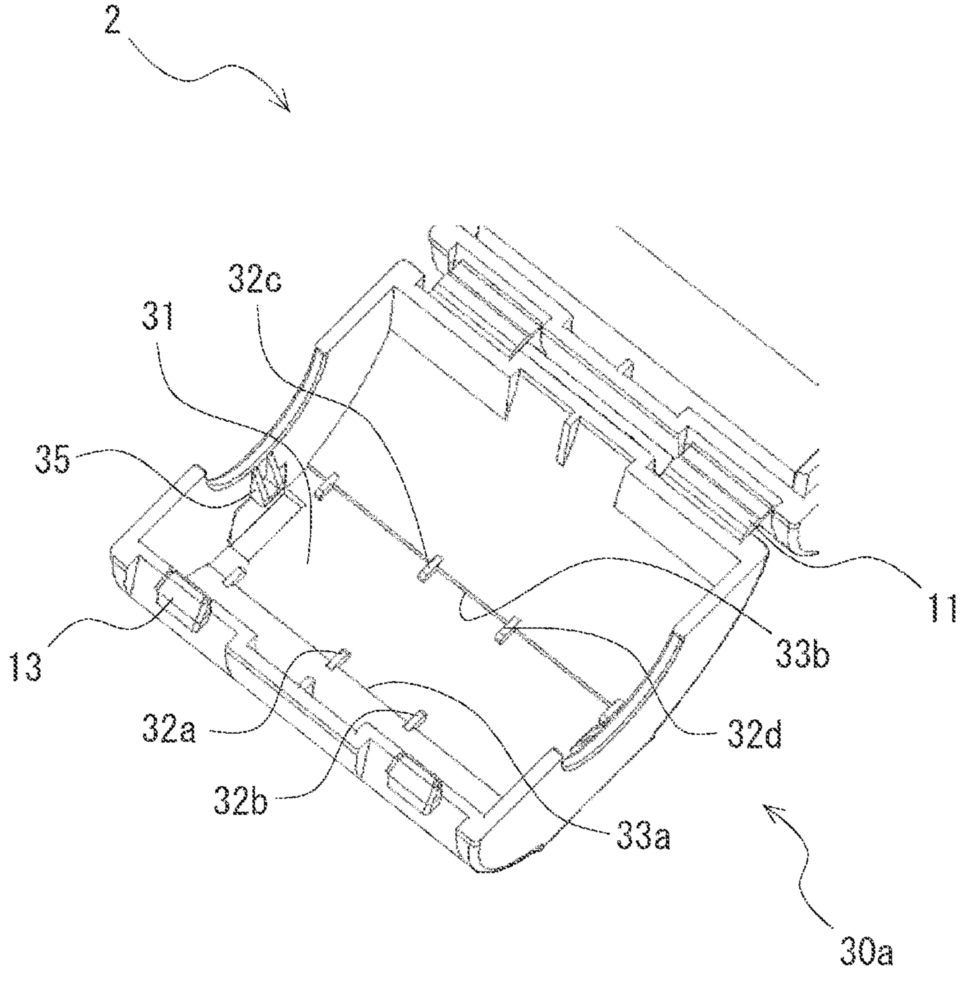
FIG. 7 is a perspective view showing the magnetic core housing according to the second embodiment.
Figure 8:
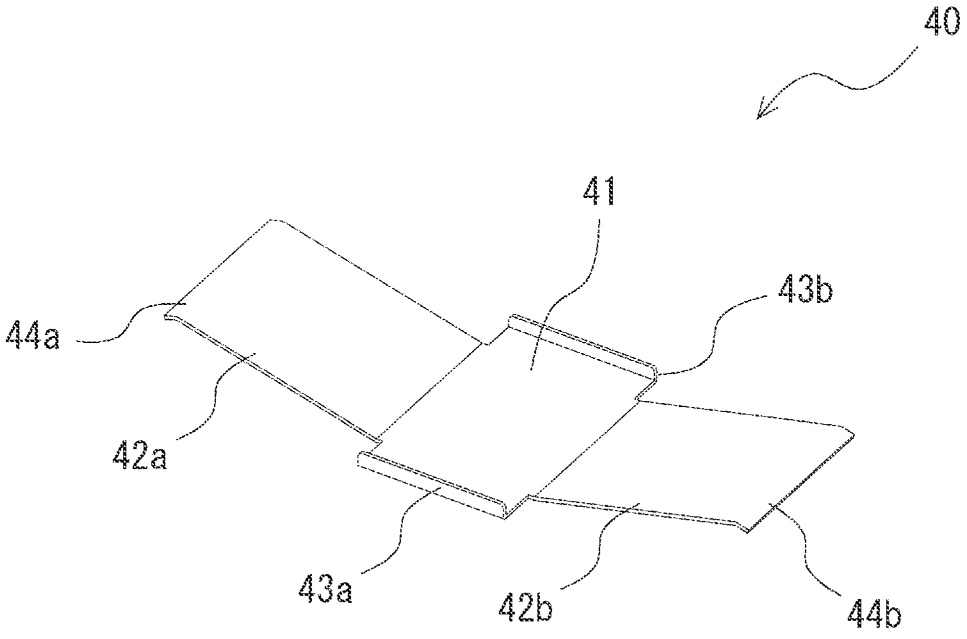
FIG. 8 is a perspective view showing an example of a metal spring provided in the magnetic core housing according to the second embodiment.
Figure 9:
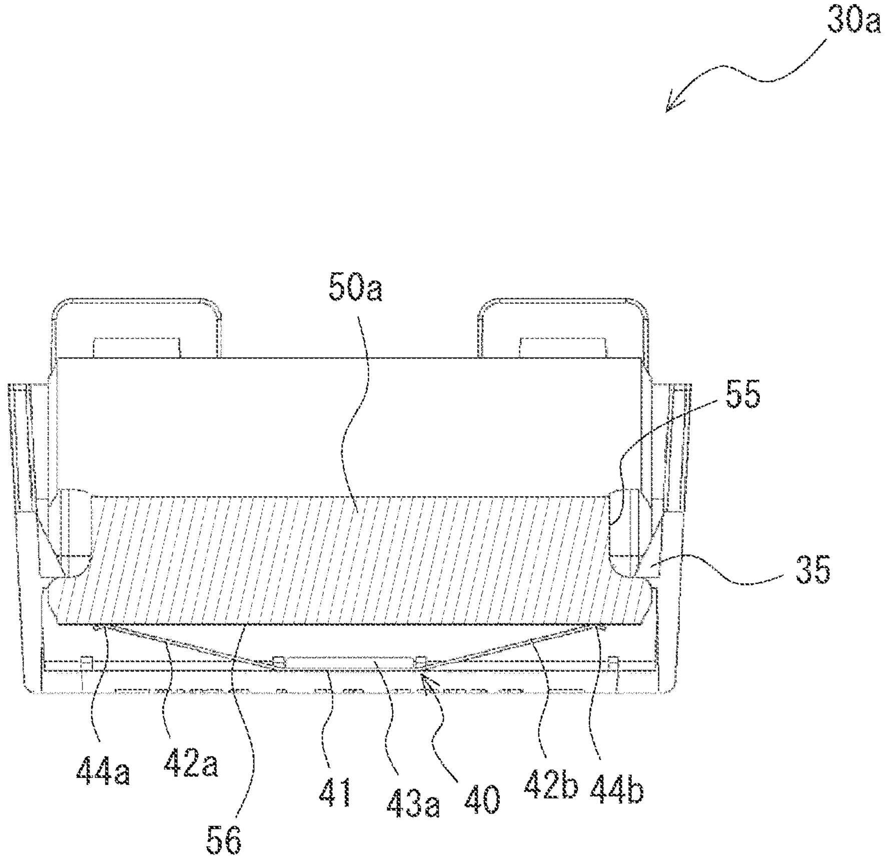
FIG. 9 is a cross-sectional view showing a state in which a magnetic core is attached to the magnetic core housing according to the second embodiment.

Next, a second embodiment according to the present disclosure will be described. Each of FIGS. 6 and 7 is a perspective view showing a magnetic core housing according to a second embodiment. FIG. 8 is a perspective view showing an example of a metal spring provided in the magnetic core housing according to the second embodiment. FIG. 9 is a cross-sectional view showing a state in which a magnetic core is attached to the magnetic core housing according to the second embodiment.

The structure of a metal spring 40 and the structure of a part of a housing 30 of a magnetic core housing 2 according to the second embodiment differs from those of the magnetic core housing 1 according to the first embodiment. The rest of the configuration of the magnetic core housing 2 according to the second embodiment is similar to that of the magnetic core housing 1 according to the first embodiment, and hence the same components are denoted by the same reference numerals (or symbols) and redundant descriptions thereof are omitted.

As shown in FIG. 6, the magnetic core housing 2 according to this embodiment is a housing capable of housing magnetic cores 50*a* and 50*b* and includes a housing 30*a* (a first housing) and a housing 30*b* (a second housing) which are two pieces divided from each other on a plane along a central axis 18. The housings 30*a* and 30*b* are connected to each other by using a hinge 11 so that they can be opened and closed with respect to each other. The magnetic core housing 2 according to this embodiment is formed of a resin material. Note that, in this specification, the housings 30*a* and 30*b* are also referred to collectively as a housing 30.

The magnetic cores 50*a* and 50*b* are two pieces divided from each other on a plane along the central axis 18, and one of the divided magnetic cores, i.e., the magnetic core 50*a* (the first core) is housed in the housing 30*a*, and the other divided magnetic core, i.e., the magnetic core 50*b* (the second core) is housed in the housing 30*b*. Note that FIG. 6 shows a state in which only the magnetic core 50*b* is housed in the corresponding housing 30*b*.

The magnetic core housing 2 according to this embodiment includes a metal spring 40. The metal springs 40 are disposed on the inner peripheral surfaces 31 (see FIG. 7) of the housings 30*a* and 30*b*. When the two divided magnetic cores 50*a* and 50*b* are housed in the housings 30*a* and 30*b*, respectively, each of the metal springs 40 applies a force toward the central axis 18 to a respective one of the magnetic cores 50. As a result, it is possible, when the noise reduction device is attached around the signal cable, to bring the two divided magnetic cores 50*a* and 50*b* into close contact with each other on their division surfaces. Note that it is preferred that a metal spring 40 be provided in each of the housings 30*a* and 30*b*. However, in this embodiment, the metal spring 40 may be provided in only one of the housings 30*a* and 30*b*.

As shown in FIGS. 6 and 8, the metal spring 40 includes a planar part 41, and a pair of spring parts 42*a* and 42*b*. The pair of spring parts 42*a* and 42*b* are configured so as to be inclined from both ends of the planar part 41, which are ends in the direction in which the central axis 18 extends (i.e., both ends of the planar part 41 in the longitudinal direction of the magnetic core housing 2), toward the central axis 18 (toward the cavity 19). Further, in this embodiment, the metal spring 40 includes reinforcing means. The reinforcing means is means for preventing the planar part 41 from being bent due to a force transmitted from the pair of spring parts 42*a* and 42*b* to the planar part 41 when the magnetic cores 50*a* and 50*b* are housed in the housings 30*a* and 30*b*.

As shown in FIG. 8, the planar part 41 of the metal spring 40 has a rectangular shape, and reinforcing means 43*a* and 43*b* can be formed by folding each of two sides of the rectangular planar part 41 located between the two sides thereof on which the pair of spring parts 42*a* and 42*b* are formed into an L-shape in cross section. In the example of the configuration shown in FIG. 8, the reinforcing means 43*a* and 43*b* are formed by folding the two sides of the planar part 41 opposed to each other toward the central axis 18 (i.e., toward the inner side of the housings 30*a* and 30*b*), and thereby folding each of them into an L-shape in cross section.

As shown in FIG. 7, four upright parts 32*a* to 32*d* are formed on the inner peripheral surface 31 of the housing 30*a*. A wall part 33*a* is formed between the upright parts 32*a* and 32*b*. A wall part 33*b* is formed between the upright parts 32*c* and 32*d*. When the metal spring 40 is attached to the housing 30*a*, the four upright parts 32*a* to 32*d* abut against (i.e., come into contact with) the four corners, respectively, of the planar part 41 of the metal spring 40. Further, the outer wall surface of the reinforcing means 43*a* abuts against the wall part 33*a* located between the upright parts 32*a* and 32*b*. Further, the outer wall surface of the reinforcing means 43*b* abuts against the wall part 33*b* located between the upright parts 32*c* and 32*d*. By the above-described configuration, it is possible to prevent the metal spring 20 from moving in the direction in which the central axis 18 extends or in the direction perpendicular to the central axis 18.

The metal spring 40 abuts against a surface 56 (see FIG. 9) of the magnetic core 50*a* at abutting parts 44*a* and 44*b*. Further, when the magnetic core 50 is housed in the housings 30*a* and 30*b*, the abutting parts 44*a* and 44*b* of the metal spring 40 slide on the surface 56 (see FIG. 9) of the magnetic core 50*a*.

Further, the metal spring 40 may have such a structure that the ends of the pair of spring parts 42*a* and 42*b* on the side opposite to the side on which the planar part 41 is located may be folded in a direction receding from the central axis 18. That is, the end of each of the spring parts 42*a* and 42*b* in the longitudinal direction may be folded toward the outer side of the corresponding one of the housings 30*a* and 30*b*. In this way, it is possible to make the shape of the contact surface between each of the abutting parts 44*a* and 44*b* and the surface 56 of the magnetic core 50 roughly a linear shape. Therefore, when the magnetic core 50 is housed in the housings 30*a* and 30*b*, the abutting parts 44*a* and 44*b* can easily slide on the surface 56 (see FIG. 9) of the magnetic core 50.

Note that, in this embodiment, similarly to the configuration of the first embodiment, a projection 17 (see FIG. 2) may be provided on the inner peripheral surface of each of (or one of) the housings 30*a* and 30*b*, and a hole 25 (see FIG. 3) may be formed in the metal spring 40, so that the projection 17 provided in each of (or one of) the housings 30*a* and 30*b* may be mated with (i.e., inserted into) the hole 25 of the metal spring 40.

As shown in FIG. 9, when the magnetic core 50*a* is housed in the housing 30*a*, the magnetic core 50*a* abuts against the metal spring 40. In this way, a force toward the central axis 18 is applied to the magnetic core 50*a*. Further, cutout parts 55 are formed on the side surfaces of the magnetic core 50*a*, and projections 35 formed in the housing 30*a* abut against (i.e., mate with) the cutout parts 55, thus making it possible to prevent the magnetic core 50*a* from being dislodged from the housing 30*a*.

Further, when the noise reduction device (the magnetic core housing 2 in which the magnetic core 50 housed) is attached around a signal cable, the signal cable is disposed in the cavity 19 of the magnetic core 50*a*. Since a force from the metal spring 20 toward the central axis 18 is applied to the magnetic core 50, it is possible to bring the two divided magnetic cores 50*a* and 50*b* into close contact with each other on their division surfaces.

In the above-described magnetic core housing 2 according to this embodiment, similarly to the first embodiment, it is possible, when the magnetic core 50 is housed in the housing 30, to apply a sufficient force to the magnetic core 50 by using the metal spring 40. Therefore, it is possible, when the noise reduction device is attached around a signal cable, to bring the two divided magnetic cores 50*a* and 50*b* into close contact with each other on their division surfaces.

Other Embodiment

Figure 10:
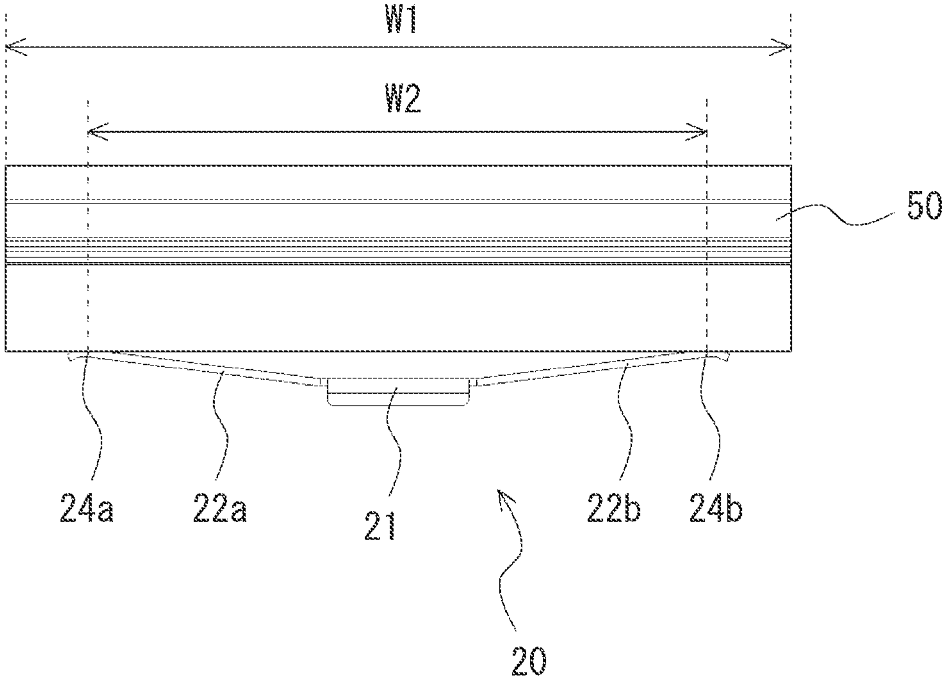
FIG. 10 is a cross-sectional view for explaining a relation between the sizes of a magnetic core and a metal spring.

FIG. 10 is a cross-sectional view for explaining a relation between the sizes of a magnetic core and a metal spring. For example, in the present disclosure, the sizes of the magnetic core 50 and the metal spring 20 may have the below-described relation.

As shown in FIG. 10, the width of the bottom surface (hereinafter also referred to as the bottom width) of the magnetic core 50 is represented by W1, and the width of the top (hereinafter also referred to as the top width) of the metal spring 20 is represented by W2. Note that the bottom width W1 corresponds to the length of the magnetic core 50 in the longitudinal direction. Further, the top width W2 is a distance between parts where the metal spring 20 is in contact with the magnetic core 50 and corresponds to a distance between the abutting parts 24*a* and 24*b* of the metal spring 20. In this embodiment, the magnetic core housing 1 is preferably configured so that the range of the top width W2 with respect to the bottom width W1 (i.e., the range of the ratio W2/W1) is 0.80 to 0.90. By setting the lower limit value to 0.80, it is possible, even when the spring part 22 is pushed by conceivably the largest force applied by the magnetic core 50 due to vibrations or the like, to prevent the spring part 22 from being pushed beyond the elastic limit thereof. Further, by setting the upper limit value to 0.90, it is possible, even when the spring part 22 is pushed by conceivably the largest force applied by the magnetic core 50 due to vibrations or the like, to prevent the ends of the spring part 22 in the longitudinal direction from being dislodged from the magnetic core 50.

Note that the ratio W2/W1 is a size ratio in a state in which the magnetic core housing 1 is closed, i.e., a state in which the magnetic core 50 and the metal spring 20 are set in the housing 10 and the magnetic core housing 1 is brought into a closed state. Further, although FIG. 10 shows the relation between the sizes of the magnetic core 50 and the metal spring 20 (in the first embodiment), the same applies to the relation between the sizes of the magnetic core 50 and the metal spring 40 (in the second embodiment).

Figure 11:
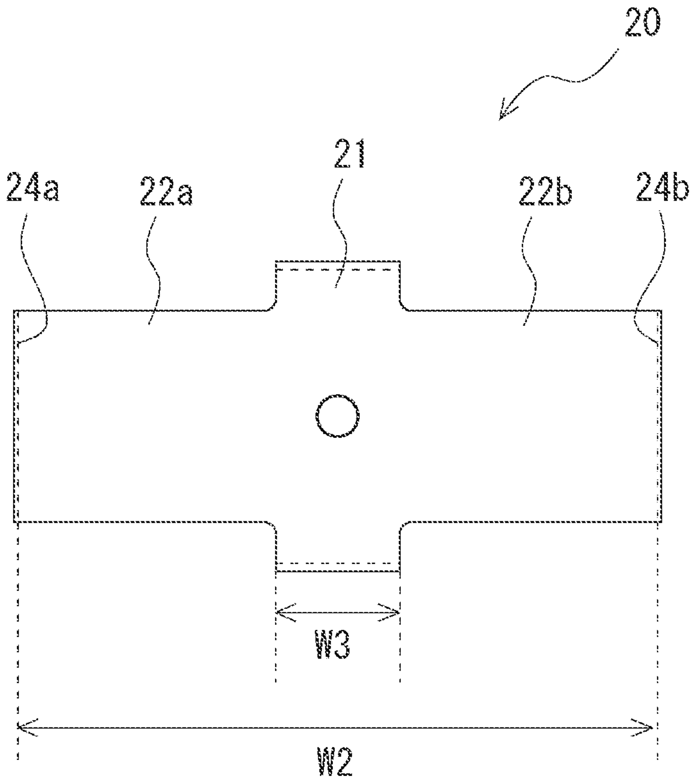
FIG. 11 is a cross-sectional view for explaining the size of the metal spring.

FIG. 11 is a cross-sectional view for explaining the size of a metal spring. For example, in the present disclosure, the metal spring 20 may have the below-described size.

As shown in FIG. 11, the distance between the abutting parts 24*a* and 24*b* of the metal spring 20 is referred to as a top width W2 (as in FIG. 10). The width of the planar part 21 of the metal spring 20 is referred to as a spring bottom-surface width W3.

In this embodiment, the magnetic core housing 1 is preferably configured so that the range of the spring bottom-surface width W3 of the metal spring 20 with respect to the top width W2 thereof (i.e., the range of the ratio W3/W2) is 0.10 to 0.25. By setting the lower limit value to 0.10, it is possible to prevent the reaction force of the metal spring 20 from being dispersed, and thereby to obtain a sufficient reaction force. Further, by setting the upper limit value to 0.25, it is possible, even when the spring part 22 is pushed by conceivably the largest force applied by the magnetic core 50 due to vibrations or the like, to prevent the spring part 22 from being pushed beyond the elastic limit thereof.

Note that the ratio W3/W2 is a size ratio in a state in which the magnetic core housing 1 is closed, i.e., a state in which the magnetic core 50 and the metal spring 20 are set in the housing 10 and the magnetic core housing 1 is brought into a closed state. Further, although FIG. 11 shows the size of the metal spring 20 (in the first embodiment), the same applies to the size of the metal spring 40 (in the second embodiment).

Further, in the above-described embodiment, an example in which the reinforcing means 23*a* and 23*b* are formed by folding each of two sides of the planar part 21 of the metal spring 20 into an L-shape in cross section has been explained. However, in the present disclosure, the reinforcing means may be formed by using the housing 10. For example, the planar part 21 of the metal spring 20 (in this example, the reinforcing means 23*a* and 23*b* are not formed therein) may be embedded in a part of the housing 10, so that the planar part 21 of the metal spring 20 may be reinforced by the housing 10 itself. Specifically, the two sides of the planar part 21 located between the two sides on which the pair of spring parts 22*a* and 22*b* are formed may be embedded in the housing 10. In this way, it is possible, when the pair of spring parts 22*a* and 22*b* are displaced (e.g., compressed or expanded), to prevent the planar part 21 from being curved at the center thereof. Therefore, it is possible to prevent the reaction force of the metal spring 20 from being dispersed, and thereby to concentrate the elastic force of the metal spring 20 into a force toward the central axis 18. Therefore, it is possible, when the magnetic core 50 is housed in the housing 10, to apply a sufficient force to the magnetic core 50 by using the metal spring 20.

Further, in the configuration according to the first embodiment, the distal end parts of the reinforcing means 23*a* and 23*b* of the metal spring 20 may be folded, and may be hooked on and fixed to the housing 10 in a snap-on fitting manner. Specifically, the distal ends of the reinforcing means 23*a* and 23*b* may be slightly bent inward or outward, so that, after the reinforcing means 23*a* and 23*b* are inserted into the openings 16*a* and 16*b*, the bent parts are hooked on the outer side of the housing 10. It should be noted that if the openings 16*a* and 16*b* of the housing 10 are roughly vertical, the reinforcing means 23*a* and 23*b* may not be easily inserted into the openings 16*a* and 16*b*. In such a case, the openings 16*a* and 16*b* of the housing 10 may be inclined inward or outward, so that the reinforcing means 23*a* and 23*b* can be easily inserted into the openings 16*a* and 16*b*.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A magnetic core housing made of a resin material, capable of housing a cylindrical magnetic core having a cavity extending in a direction of a central axis of the magnetic core, the magnetic core housing comprising:

a first housing capable of housing a first core, the first core being one of two pieces of the magnetic core divided from each other on a plane along the central axis;

a second housing capable of housing a second core, the second core being the other of the two pieces of the magnetic core divided from each other on the plane along the central axis;

a hinge configured to connect the first and second housings with each other so that the first and second housings can be opened and closed with respect to each other; and a first metal spring disposed in the first housing and configured to apply a force toward the central axis to the first core when the first core is housed in the first housing, wherein the first metal spring includes a planar part and a pair of spring parts inclined from two ends of the planar part toward the central axis, the two ends of the planar part being two ends in the direction in which the central axis extends, and reinforcing parts for preventing the planar part from being bent due to the force transmitted from the pair of spring parts when the first core is housed in the first housing, the planar part having a rectangular shape, the reinforcing parts extending from two different ends of the planar part than the two ends from which the pair of spring parts extends, the reinforcing parts folded to form an L-shape in cross section, openings are formed at positions corresponding to the respective reinforcing parts of the first housing in a direction orthogonal to the central axis, and each of the reinforcing parts is inserted into a respective one of the openings of the first housing, so that each of the reinforcing parts is positioned.

2. A noise reduction device comprising:

the magnetic core housing according claim 1;

the first core housed in the first housing; and the second core housed in the second housing.

3. The magnetic core housing according to claim 1, wherein the two ends of the planar part from which the spring parts extend are a first set of opposing ends of the planar part, and wherein the two ends of the planar part from which the reinforcing parts extend are a second pair of opposing ends of the planar part.

* * * * *